United States Patent
Mizuno et al.

(10) Patent No.: US 9,950,680 B2
(45) Date of Patent: Apr. 24, 2018

(54) METHOD FOR ASSEMBLING WIRE HARNESS, INTERFERENCE SUPPRESSING MEMBER, AND WIRE HARNESS ASSEMBLY STRUCTURE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Hosei Mizuno, Mie (JP); Hiroki Hirai, Mie (JP); Masaaki Tabata, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/523,151

(22) PCT Filed: Oct. 22, 2015

(86) PCT No.: PCT/JP2015/079781
§ 371 (c)(1),
(2) Date: Apr. 28, 2017

(87) PCT Pub. No.: WO2016/076095
PCT Pub. Date: May 19, 2016

(65) Prior Publication Data
US 2017/0313266 A1    Nov. 2, 2017

(30) Foreign Application Priority Data
Nov. 10, 2014   (JP) .................. 2014-227916

(51) Int. Cl.
*H02G 3/32* (2006.01)
*B60R 16/02* (2006.01)
(Continued)

(52) U.S. Cl.
CPC ....... *B60R 16/0215* (2013.01); *H01B 7/0045* (2013.01); *H02G 3/0406* (2013.01); *H02G 3/32* (2013.01)

(58) Field of Classification Search
CPC ...... B60R 16/0215; B60R 16/02; H02G 3/32; H02G 3/0406; H02G 3/04; H01B 7/0045; H01B 7/00
(Continued)

(56) References Cited

U.S. PATENT DOCUMENTS 6,685,259 B1 *  2/2004  Shimase ............. B60R 16/0215
                                                    296/192
6,802,559 B2 * 10/2004  Yoshihara ............ B62D 25/142
                                                    296/208
(Continued)

FOREIGN PATENT DOCUMENTS

JP    H1143227 A    2/1999
JP    2000166061 A  6/2000
(Continued)

OTHER PUBLICATIONS

International Search Report and Written Opinion for application PCT/JP2015/079781 dated Dec. 22, 2015; 6 Pages.

*Primary Examiner* — Timothy Thompson
*Assistant Examiner* — Michael F McAllister
(74) *Attorney, Agent, or Firm* — Reising Ethington, P.C.

(57) ABSTRACT

A wire harness assembling method includes a step (a) of attaching an interference suppressing member to at least a part of an elongated reinforcement, the reinforcement being arranged on a back side of an instrument panel of a vehicle (Continued)

and extending in a width direction of the vehicle; and a step (b) of arranging a wire harness so that the wire harness faces the reinforcement with the interference suppressing member interposed between the wire harness and the reinforcement, the step (b) being performed after the step (a).

7 Claims, 8 Drawing Sheets

(51) Int. Cl.
*H01B 7/00* (2006.01)
*H02G 3/04* (2006.01)

(58) Field of Classification Search
USPC .................................................. 174/72 C
See application file for complete search history.

(56) References Cited

U.S. PATENT DOCUMENTS

| | | | |
|---|---|---|---|
| 2003/0155793 A1* | 8/2003 | Yoshihara | B62D 25/142 296/208 |
| 2006/0026850 A1* | 2/2006 | Goslee | G01C 17/38 33/357 |
| 2013/0206928 A1 | 8/2013 | Murakoshi | |

FOREIGN PATENT DOCUMENTS

| | | |
|---|---|---|
| JP | 2011055566 A | 3/2011 |
| JP | 2012055105 A | 2/2012 |
| JP | 2013118741 A | 6/2013 |
| JP | 2014011837 A | 1/2014 |

* cited by examiner

*Figure 1*
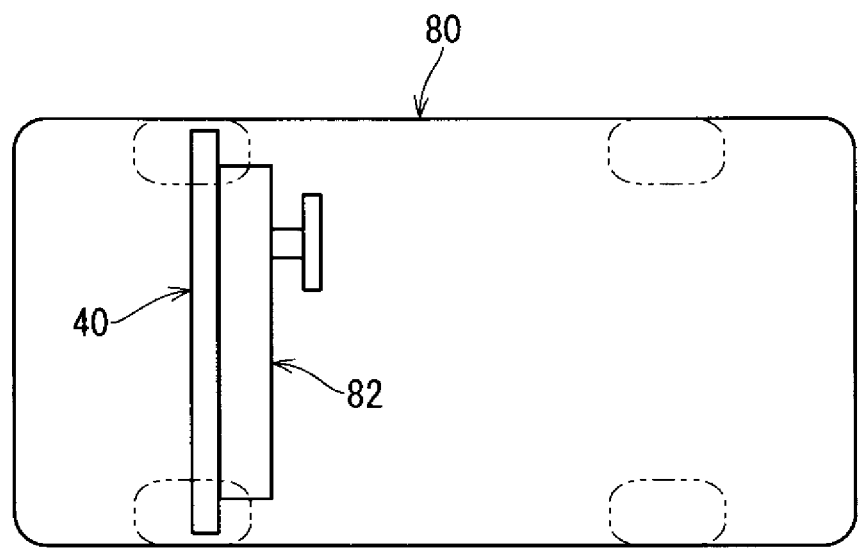
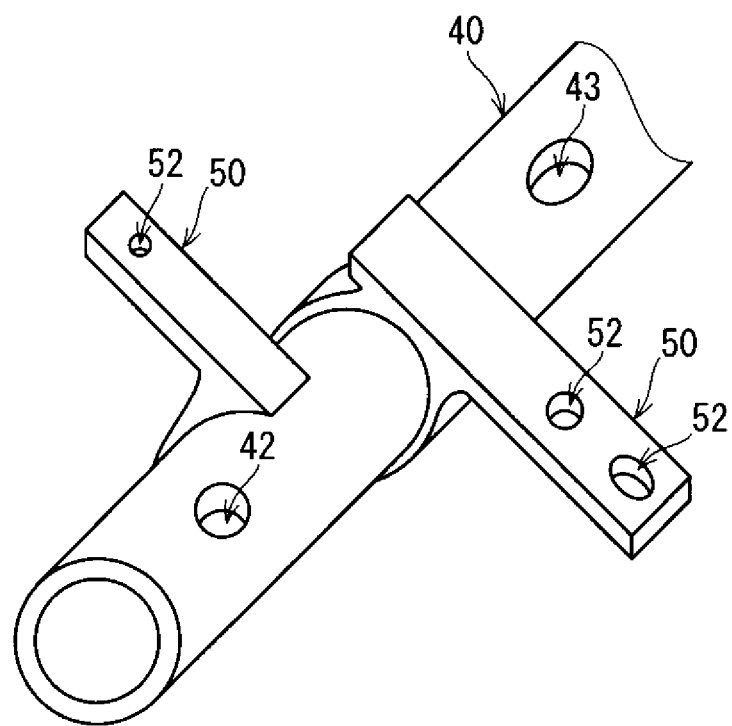
*Figure 2*

*Figure 11*
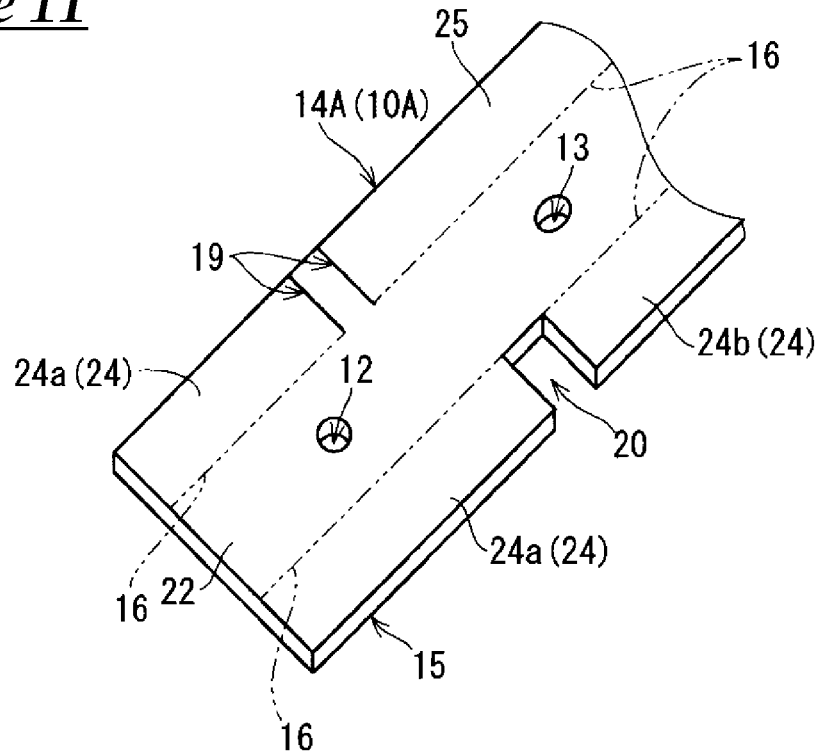
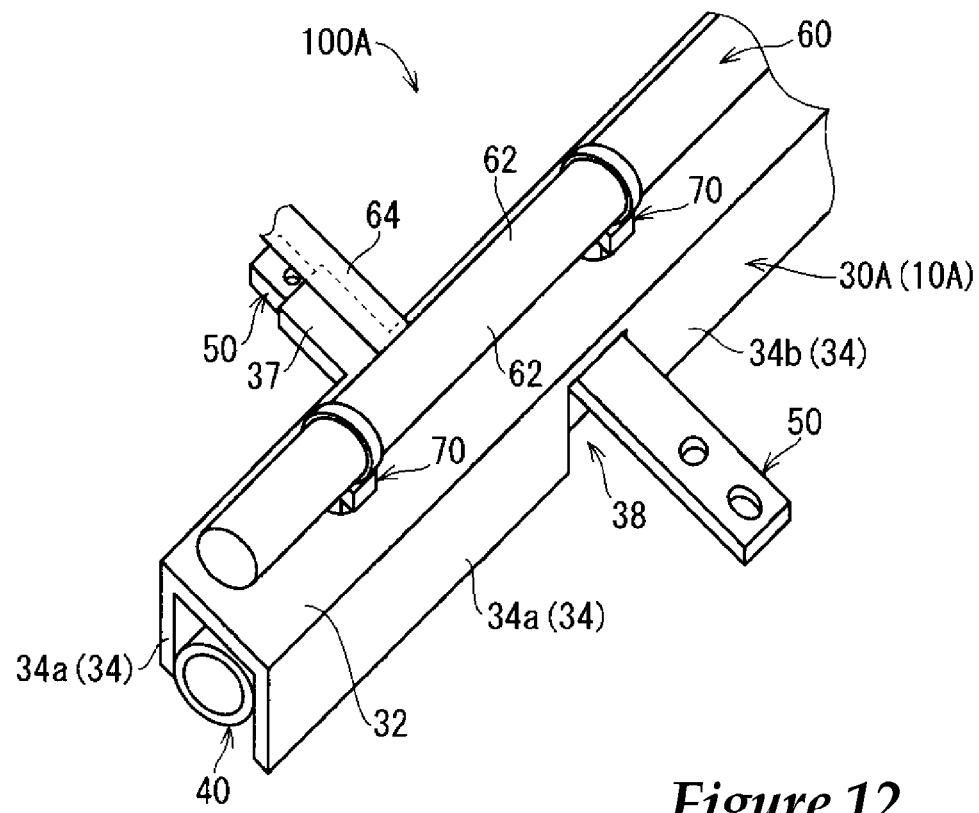
*Figure 12*

METHOD FOR ASSEMBLING WIRE HARNESS, INTERFERENCE SUPPRESSING MEMBER, AND WIRE HARNESS ASSEMBLY STRUCTURE

CROSS REFERENCE TO RELATED APPLICATIONS

This application claims the priority of Japanese patent application JP2014-227916 filed on Nov. 10, 2014, the entire contents of which are incorporated herein.

TECHNICAL FIELD

The present invention relates to a method for assembling a wire harness to a reinforcement that is arranged on the back side of an instrument panel.

BACKGROUND ART

Electric wires of wire harnesses that are installed in vehicles such as automobiles may be fixed to a reinforcement (hereinafter, referred to as "instrument panel reinforcement") that is arranged on the back side of an instrument panel.

For example, a plurality of electric wires that are wound into a bundle with a tape may be fixed to the instrument panel reinforcement using a harness clamp disclosed in Patent Document 1 (JP 2013-118741A). In this case, the tape wound around the electric wires functions as a protection member that prevents the electric wires from coming into contact with the instrument panel reinforcement and components on the periphery.

SUMMARY OF INVENTION

Meanwhile, there are cases where another electric wire that is arranged in the vicinity of the electric wires fixed to the instrument panel reinforcement comes into contact with the instrument panel reinforcement. In such a case, the other electric wire also needs a protection member.

However, the electric wires arranged on the instrument panel reinforcement need to be respectively provided with protection members, and thus an increase in the number of components and complication of the assembly operation are a cause of concern.

It is an object of the present design to provide a technique capable of suppressing an increase in the number of components that constitute a wire harness that is arranged in the vicinity of an instrument panel reinforcement, and complication of the assembly operation.

In order to solve the above-described problems, according to a first aspect, a wire harness assembling method includes: a step (a) of attaching an interference suppressing member to at least a part of an elongated reinforcement, the reinforcement being arranged on a back side of an instrument panel of a vehicle and extending in a width direction of the vehicle; and a step (b) of arranging a wire harness so that the wire harness faces the reinforcement with the interference suppressing member interposed between the wire harness and the reinforcement, the step (b) being performed after the step (a). Furthermore, the interference suppressing member is made of a sheet-shaped member that is made of a resin and whose width is larger than a width of the reinforcement, and the method further includes a step (c) of bending at least a part of the sheet-shaped member to form that part of the interference suppressing member that covers a periphery of the reinforcement when the interference suppressing member is attached to the reinforcement. The interference suppressing member covers one side of the wire harness.

According to a third aspect, in the wire harness assembling method as per the first aspect, at least one bracket may be attached to the reinforcement and may extend in a direction that intersects a longitudinal direction of the reinforcement, and the method may further include a step (c1) of bending a pair of side surface portion forming portions that are located at an end in a width direction of the sheet-shaped member, and face each other in a longitudinal direction of the sheet-shaped member at a distance that is larger than a width of the bracket, so that an opening from which the bracket protrudes outward is formed in the interference suppressing member.

According to a fourth aspect, in the wire harness assembling method as per the first or third aspects, the reinforcement may be provided with an attaching hole, the interference suppressing member may be provided with a through hole at a position that corresponds to the attaching hole, and the wire harness is provided with a clamp that engages with the attaching hole, and the method may further include a step (b1) of fixing the wire harness to the reinforcement by passing the clamp through the through hole, and engaging the clamp with the attaching hole.

According to a fifth aspect, an interference suppressing member is made of a sheet-shaped member made of a resin, and is configured to be attached to a reinforcement that is arranged on a back side of an instrument panel of a vehicle and extends in a width direction of the vehicle, the interference suppressing member including, a bottom portion that extends in a longitudinal direction of the reinforcement. The interference suppressing member further includes a side surface portion that is obtained by bending an end in a width direction of the bottom portion. The interference suppressing member is configured to cover one side of a wire harness.

According to a seventh aspect, in the interference suppressing member as per the fifth aspect, at least one bracket may be attached to the reinforcement and may extend in a direction that intersects a longitudinal direction of the reinforcement, and the side surface portion of the interference suppressing member may be provided with an opening from which the bracket can protrude outward.

According to an eighth aspect, the interference suppressing member as per the seventh aspect may further include a sideward protruding portion that extends from an inner peripheral edge of the opening in a direction in which the bracket protrudes, the sideward protruding portion being configured to cover the bracket.

According to a ninth aspect, a wire harness assembly structure includes: an elongated reinforcement that is arranged on a back side of an instrument panel of a vehicle and extends in a width direction of the vehicle; the interference suppressing member according to any one of the fifth, seventh, and eighth aspects that is attached to the reinforcement; and a wire harness that is arranged facing the reinforcement with the interference suppressing member interposed between the wire harness and the reinforcement.

In the wire harness assembling method according to the first to fourth aspects, since the step (a) of attaching an interference suppressing member to at least a part of an elongated reinforcement, the reinforcement being arranged on a back side of an instrument panel of a vehicle and extending in a width direction of the vehicle, is performed prior to the step (b) of arranging a wire harness so that the wire harness faces the reinforcement with the interference suppressing member interposed between the wire harness and the reinforcement, it is possible to suppress an increase in the number of components that constitute the wire harness that is arranged in the vicinity of an instrument panel reinforcement, and complication of the assembly operation.

Particularly, in the wire harness assembling method according to the first aspect, since the interference suppressing member is made of a sheet-shaped member whose width is larger than a width of the reinforcement, and the method further includes the step (c) of bending at least a part of the sheet-shaped member to form that part of the interference suppressing member that covers a periphery of the reinforcement when the interference suppressing member is attached to the reinforcement, it is possible to easily prevent the interference between electric wires and the reinforcement in a broader range.

Particularly, since the wire harness assembling method according to the third aspect further includes the step (c1) of bending a pair of side surface portion forming portions that are located at an end in a width direction of the sheet-shaped member, and face each other in a longitudinal direction of the sheet-shaped member at a distance that is larger than a width of the bracket, so that an opening from which the bracket protrudes outward is formed in the interference suppressing member, it is possible to bend the sheet-shaped member while avoiding the bracket. With this, it is possible to easily prevent the interference between electric wires and the reinforcement in broader range.

Particularly, since the wire harness assembling method according to the fourth aspect further includes the step (b1) of fixing the wire harness to the reinforcement by passing the clamp through the through hole, and engaging the clamp with the attaching hole, the interference suppressing member as well is fixed to the reinforcement. At this time, those portions of the interference suppressing member that are located around the through holes are sandwiched by the wire harness and the reinforcement, and thus the interference suppressing member is prevented from wobbling.

The interference suppressing member according to the fifth to eighth aspects includes the bottom portion that extends in a longitudinal direction of the reinforcement, and thus by attaching the interference suppressing member, prior to the wire harness, to the reinforcement, it is possible to suppress an increase in the number of components that constitute the wire harness that is arranged in the vicinity of an instrument panel reinforcement, and complication of the assembly operation.

Particularly, since the interference suppressing member according to the fifth aspect further includes the side surface portion, it is possible for the interference suppressing member to cover the periphery of the reinforcement. With this, it is possible to more reliably prevent the interference between the reinforcement and the wire harness.

Particularly, in the interference suppressing member according to the seventh aspect, since the side surface portion of the interference suppressing member is provided with an opening from which the bracket can protrude outward, the side surface portion can cover the reinforcement while avoiding the bracket.

Particularly, the interference suppressing member according to the eighth aspect further include a sideward protruding portion that extends from an inner peripheral edge of the opening in a direction in which the bracket protrudes, the sideward protruding portion being configured to cover the bracket, and thus it is possible to prevent the bracket from interfering with electric wires that constitute the wire harness.

The wire harness assembly structure according to the ninth aspect includes: an elongated reinforcement that is arranged on a back side of an instrument panel of a vehicle and extends in a width direction of the vehicle; the interference suppressing member according to any one of the fifth, seventh, and, eighth aspects that is attached to the reinforcement; and a wire harness that is arranged facing the reinforcement with the interference suppressing member interposed between the wire harness and the reinforcement, and thus by attaching the interference suppressing member, prior to the wire harness, to the reinforcement, it is possible to suppress an increase in the number of components that constitute the wire harness that is arranged in the vicinity of an instrument panel reinforcement, and complication of the assembly operation.

BRIEF DESCRIPTION OF DRAWINGS

FIG. 1 illustrates the location in a vehicle at which a reinforcement is arranged.

FIG. 2 is a perspective view of the reinforcement.

FIG. 11 is a perspective view illustrating an interference suppressing member according to a modification.

FIG. 12 is a perspective view illustrating a state in which the interference suppressing member according to the modification is attached to the reinforcement.

DESCRIPTION OF EMBODIMENTS

Figure 3:
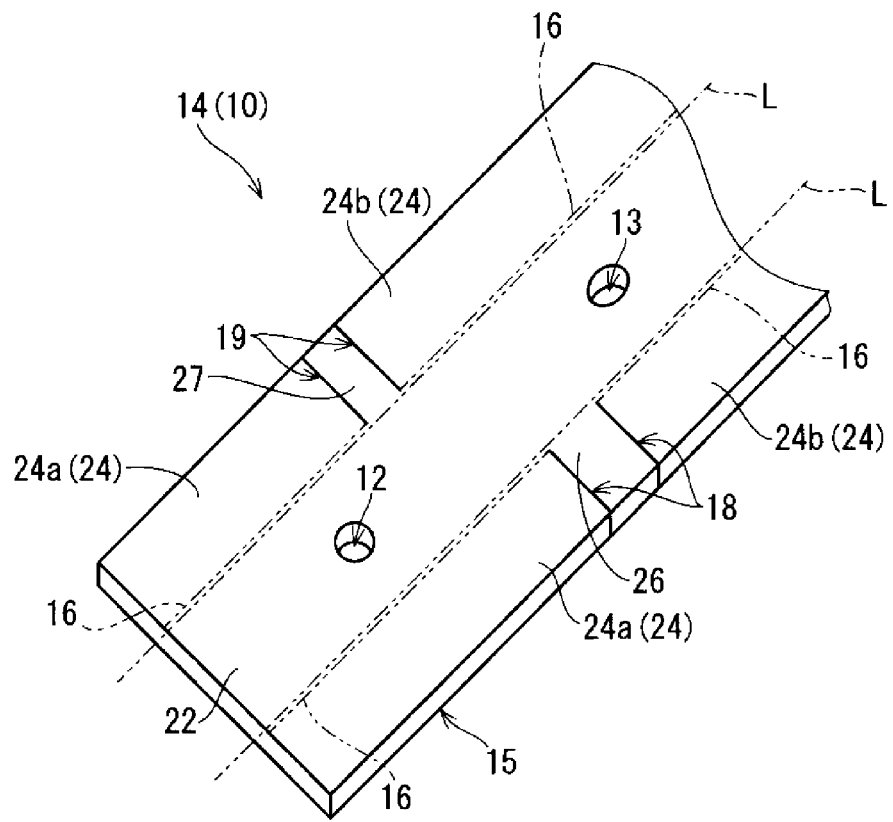
FIG. 3 is a perspective view illustrating an interference suppressing member before it is bent.

Hereinafter, a wire harness assembling method according to an embodiment will be described. The wire harness assembling method according to the embodiment is a method in which an interference suppressing member is attached to a reinforcement (instrument panel reinforcement) that is arranged on a back side of an instrument panel of a vehicle and extends in a width direction of the vehicle, and then a wire harness is arranged thereon.

The following will describe members that are used in the wire harness assembling method according to the embodiment.

FIG. 1 illustrates the location in a vehicle 80 at which a reinforcement 40 is arranged. FIG. 2 is a perspective view of the reinforcement 40.

The reinforcement 40 is arranged on the back side of an instrument panel 82 of the vehicle 80 and extends in the width direction of the vehicle 80. The reinforcement 40 is elongated (here, in the shape of an elongated tube). Here, the reinforcement 40 is provided with attaching holes 42 and 43. Furthermore, here, brackets 50 are attached to the reinforcement 40.

The attaching holes 42 and 43 are used for fixing a wire harness 60 to the reinforcement 40. Here, the wire harness 60 is provided with clamps 70, which will be described in detail later, and as a result of the clamps 70 being inserted into the attaching holes 42 and 43, which are formed in the shape of through holes penetrating the tubular reinforcement 40 from its outer side to its inner side, the wire harness 60 is fixed to the reinforcement 40.

Here, a pair of attaching holes 42 and 43 are formed. The attaching hole 43, which is one of the pair of attaching holes 42 and 43, is elliptical, and is set such that the long axis direction thereof is parallel to a direction in which the reinforcement 40 extends. Accordingly, it is possible to absorb a dimensional tolerance in the distance between the pair of clamps 70 that are provided on the wire harness 60.

At least one bracket 50 is attached along the longitudinal direction of the reinforcement 40. The bracket 50 is attached to the reinforcement 40 by, for example, welding or the like. Here, two brackets 50 are attached to the reinforcement 40, extending in opposite directions to each other.

The brackets 50 are also provided with an attaching hole 52 in the shape of a through hole. The attaching hole 52 of the brackets 50 is used for fixing the reinforcement 40 to the vehicle body. Furthermore, the attaching hole 52 may also be used for fixing the wire harness 60 to the reinforcement 40.

Note that although here the reinforcement 40 has the shape of an elongated tube, the shape of the reinforcement 40 is not limited to this. For example, the reinforcement may be formed such that its cross section is rectangular. Furthermore, the reinforcement may be columnar, for example. Furthermore, although here the reinforcement 40 extends straight, but the reinforcement may extend two-dimensionally or three-dimensionally.

Figure 4:
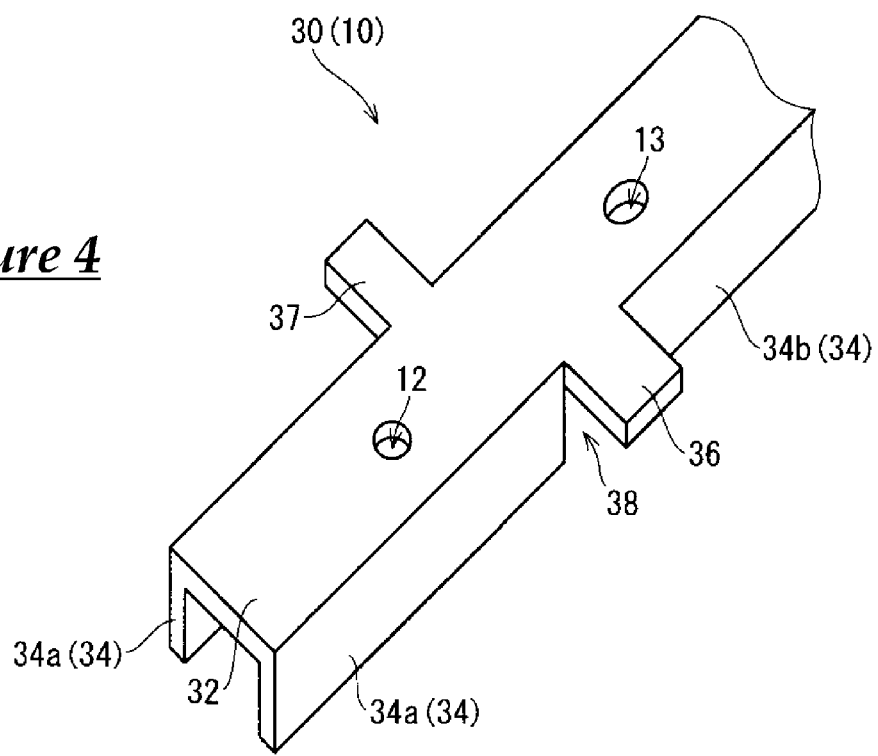
FIG. 4 is a perspective view illustrating the bent interference suppressing member.

FIG. 3 is a perspective view illustrating an interference suppressing member 10 before it is bent. FIG. 4 is a perspective view illustrating the bent interference suppressing member 10.

As shown in FIG. 3, here, the interference suppressing member 10 is made of a sheet-shaped member. The interference suppressing member 10 is attached, unbent, that is, in a sheet-shaped state as shown in FIG. 3, or in the state in which it is bent as shown in FIG. 4, to the reinforcement 40. Hereinafter, if there is a need to distinguish a case where the interference suppressing member 10 is sheet-shaped from a case where the sheet-shaped member is bent, the former is referred to as "sheet-shaped interference suppressing member 14", and the latter is referred to a "three-dimensional interference suppressing member 30". If there is no need to distinguish the cases, the term "interference suppressing member 10" is used.

The interference suppressing member 10 may be made of any material such as a resin as long as it can prevent the interference between the reinforcement 40 and electric wires constituting the wire harness 60. Preferably, the interference suppressing member 10 may be made of a material that is softer than the reinforcement 40, and is not subject to scratch damage, such as burrs that occur due to welding of the brackets 50 or cracks at its edge, or the like. More preferably, the interference suppressing member 10 may be made of a nonwoven fabric or a hollow board member 90. Here, description will be given assuming that the interference suppressing member 10 is made of the hollow board member 90.

Figure 5:
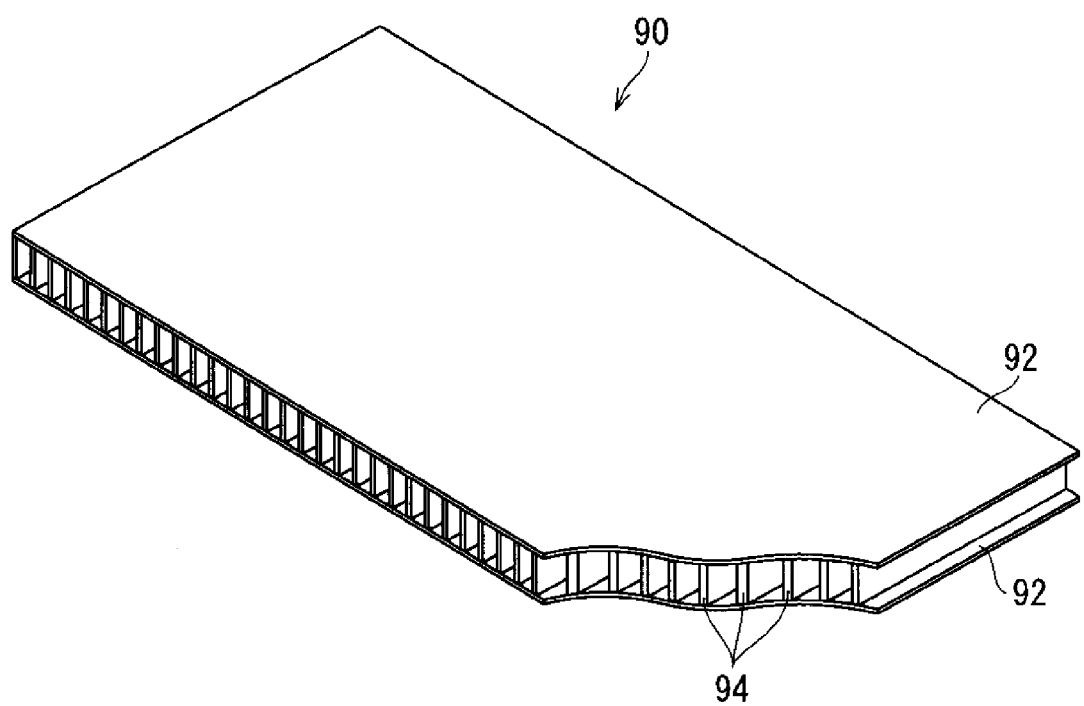
FIG. 5 is a partially cut-off perspective view illustrating an example of a hollow board member.

First, a configuration of such a hollow board member 90 is described. FIG. 5 is a partially cut-off perspective view illustrating an example of the hollow board member 90.

This hollow board member 90 includes a plurality of (two in this example) plate-shaped portions 92, and interposed portions 94 that are interposed between the plurality of plate-shaped portions 92.

The constituent material of the plurality of plate-shaped portions 92 and the interposed portions 94 is not particularly limited. The plurality of plate-shaped portions 92 and the interposed portions 94 may be made of paper, a resin, or a combination thereof. If at least one of the plurality of plate-shaped portions 92 and the interposed portions 94 is made of paper, it is preferable that the surface thereof be subjected to water-repellent processing or the like.

The plate-shaped portions 92 are flat. The plurality of plate-shaped portions 92 are connected to each other at a distance via the interposed portions 94.

Here, a plurality of interposed portions 94 are provided between the plurality of plate-shaped portions 92 and are parallel to one another at intervals.

Each interposed portion 94 has the shape of an elongated plate, and is connected to the plate-shaped portions 92 on both sides, orthogonally to the plate-shaped portions 92.

Accordingly, when the hollow board member 90 is cut along a surface that is orthogonal to a direction in which the interposed portions 94 extend, the cross section shows a ladder-structure in which the plurality of interposed portions 94 are parallel to one another between the pair of plate-shaped portions 92.

Such a hollow board member 90 can be manufactured continuously using, for example, an extrusion molding device that extrudes a resin from extrusion holes that correspond to the ladder-structured cross section, and thus it is possible to easily manufacture the plate material at low cost. Alternatively, the hollow board member 90 can be manufactured by bonding the two plate-shaped portions 92 to both sides of the plurality of interposed portions 94 that are arranged in parallel to one another, by thermal welding or applying an adhesive, for example.

The plate material with a hollow structure is not limited to the above-described example. For example, the plate material may have a configuration in which an interposed portion in which mountain parts and valley parts are successive in the shape of waves is interposed between a plurality of plate-shaped portions. Alternatively, the plate material may also have a configuration in which interposed portions that are present between a plurality of plate-shaped portions form a hollow shape of polygonal columns such as triangular prisms, and particularly form a honeycomb structure.

Of these plate materials having a hollow structure, a plate material made of a resin may be referred to as "corrugated plastic" (or "plastic cardboard").

The interference suppressing member 10 that is made of a hollow board member can have the following advantages. That is, since the hollow board member 90 includes the plurality of interposed portions 94 that are arranged in parallel to one another at intervals, the hollow board member 90 is unlikely to be bent in the direction in which the interposed portions 94 extend, while the hollow board member 90 is likely to bent in the direction in which the interposed portions 94 are arranged in parallel to one another. Furthermore, the hollow board member 90 has superior strength due to its structure that forms a hollow structure. Furthermore, since the hollow board member 90 has a hollow structure, it is relatively lightweight for its strength. Furthermore, the amount of material used for the hollow board member 90 is small for its strength. Accordingly, it is possible to reduce the material cost.

Returning to FIGS. 3 and 4, the sheet-shaped interference suppressing member 14 and the three-dimensional interference suppressing member 30 will be described. Here, for convenience of description, the three-dimensional interference suppressing member 30 will first be described.

As shown in FIG. 4, the three-dimensional interference suppressing member 30 includes a bottom portion 32 and side surface portions 34. Here, the three-dimensional interference suppressing member 30 further includes sideward protruding portions 36 and 37.

The bottom portion 32 is a portion that extends in the direction in which the reinforcement 40 extends, and covers the reinforcement 40 from one direction. The bottom portion 32 is provided with at least one through hole. Here, since the pair of attaching holes 42 and 43 are formed in the reinforcement 40, a pair of through holes 12 and 13 are formed in the bottom portion 32 at a distance.

The through holes 12 and 13 are provided at positions that correspond to the attaching holes 42 and 43 formed in the reinforcement 40 in a state in which the bottom portion 32 covers the reinforcement 40. The through holes 12 and 13 are provided so that, when engaging pieces 73 of the clamps 70 of the wire harness 60 that is arranged facing the reinforcement 40 with the interference suppressing member 10 interposed therebetween are fitted into the attaching holes 42 and 43, the engaging pieces 73 can penetrate the interference suppressing member 10. Specifically, the through holes 12 and 13 are formed so as to have a size that is equal to or larger than (here, slightly larger than) the attaching holes 42 and 43. Furthermore, since one attaching hole 43 is elliptical, the through hole 13 that is formed at the position that corresponds to the one attaching hole 43 is also elliptical.

The side surface portions 34 are portions that are formed upright at the ends, in the width direction, of the bottom portion 32, and cover the periphery of the reinforcement 40 from directions that are different from the direction in which the bottom portion 32 covers the reinforcement 40. Accordingly, the reinforcement 40 is covered by the bottom portion 32 and the side surface portions 34. More specifically, here, the side surface portions 34 are provided upright in a direction that is orthogonal to the width direction of the bottom portion 32. Of course, the side surface portions 34 may also be provided upright while being curved and connected to the ends of the bottom portion 32. As a result of the side surface portions 34 being provided upright at both ends in the width direction of the bottom portion 32, the three-dimensional interference suppressing member 30 is gutter-shaped. Here, the side surface portions 34 are each provided with an opening 38. The opening 38 separates the side surface portion 34 into a first side surface portion 34a and a second side surface portion 34b. In another view, the first side surface portion 34a and the second side surface portion 34b are provided facing each other with the opening 38 interposed therebetween.

The openings 38 are formed so as to enable the brackets 50 to protrude outward. Here, each opening 38 is formed as a recess portion that is recessed toward the bottom portion 32 from that end of the side surface portion 34 that is opposite to the side on which it is connected to the bottom portion 32. The width of the recess portions is set so as to be equal to or larger than (here, slightly larger than) the width of the brackets 50. However, it is not essential that each opening 38 be formed as a recess portion, and the opening 38 may be formed as a through hole that penetrates the side surface portion 34.

The sideward protruding portions 36 and 37 protrude from the inner peripheral edges of the openings 38. The sideward protruding portions 36 and 37 are portions that cover the brackets 50. More specifically, here, the recess portions reach the bottom portion 32, and the sideward protruding portions 36 and 37 protrude from the bottom portion 32 of the inner peripheral edges of the recess portions.

The following will describe the sheet-shaped interference suppressing member 14. Because the three-dimensional interference suppressing member 30 is made of the sheet-shaped interference suppressing member 14, the sheet-shaped interference suppressing member 14 includes, as shown in FIG. 3, a sheet-shaped base material 15 that is provided with folding lines 16 and slits 18 and 19. Here, the hollow board member 90 is used as the base material 15.

The folding lines 16 are located on reference lines L that extend in the longitudinal direction of the base material 15 and are located in the central portion in the width direction of the base material 15. Here, a pair of reference lines L and a pair of folding lines 16 are provided. The distance between the pair of reference lines L and between the pair of folding lines 16 may be equal to or different from the width of the reinforcement 40. Since the side surface portions 34 of the three-dimensional interference suppressing member 30 are provided upright so as to be orthogonal to the bottom portion 32, the distance between the pair of reference lines L and between the folding lines 16 is set to be equal to or larger than (here, slightly larger than) the width of the reinforcement 40. Note here that, when the sheet-shaped interference suppressing member 14 is bent to form the three-dimensional interference suppressing member 30, sideward protruding portion forming portions 26 and 27 (portions 26 and 27 that correspond to the sideward protruding portions), which will be described later, are not bent, and thus no folding line 16 is provided between the sideward protruding portion forming portions 26 and 27 and a bottom portion forming portion 22 (portion 22 that corresponds to the bottom portion). Accordingly, the folding lines 16 have an interruption in the longitudinal direction of the base material 15.

If the direction in which the interposed portions 94 of the hollow board member 90 extend is matched with the longitudinal direction of the base material 15, it is possible to provide the folding lines 16 in the direction in which the interposed portions 94 extend. Accordingly, the base material 15 is likely to be bent along the folding lines 16.

Here, that part of the base material 15 that is located between the pair of reference lines L serves as the bottom portion forming portion 22, which constitutes the bottom portion 32 of the three-dimensional interference suppressing member 30. Furthermore, those parts of the base material 15 that are located to the sides of the bottom portion forming portion 22 (portions opposing the bottom portion forming portion 22 with the reference lines L interposed therebetween) serve as side surface portion forming portions 24 (portions 24 that correspond to the side surface portions), which constitute the side surface portions 34 of the three-dimensional interference suppressing member 30, and as the sideward protruding portion forming portions 26 and 27, which constitute the sideward protruding portions 36 and 37 of the three-dimensional interference suppressing member 30.

The slits 18 and 19 are formed in the base material 15, extending from an end in the width direction thereof toward the center in the width direction thereof. Here, pairs of slits 18 and 19 are provided in the parts of the base material 15 that are located to the respective sides of the bottom portion forming portion 22. The distance between the pairs of slits 18 and 19 is set to be equal to or larger than (here, slightly larger than) the width of the brackets 50. Furthermore, here, the slits 18 and 19 reach the bottom portion forming portion 22.

Of the parts located to the sides of the bottom portion forming portion 22, the areas that are located between the respective pairs of slits 18 and 19 serve as the sideward protruding portion forming portions 26 and 27. Also, of the parts located to the sides of the bottom portion forming portion 22, the areas that are located to both sides of the sideward protruding portion forming portions 26 and 27 when seen in the width direction of the base material 15 serve as the side surface portion forming portions 24. One of the side surface portion forming portions 24 is a first side surface portion forming portion 24a, and the other one is a second side surface portion forming portion 24b. Accordingly, the pair of side surface portion forming portions 24a and 24b that face each other with the sideward protruding portion forming portions 26 and 27 interposed therebetween can be regarded as facing each other at a distance that is equal to or larger than the width of the brackets 50.

Then, as a result of the sideward protruding portion forming portions 26 and 27 being kept unbent and the pairs of side surface portion forming portions 24a and 24b being bent along the folding lines 16, the sheet-shaped interference suppressing member 14 is formed into the three-dimensional interference suppressing member 30. At this time, as a result of the sideward protruding portion forming portions 26 and 27 not being bent, the openings 38 of the three-dimensional interference suppressing member 30 are formed between the pairs of side surface portions 34a and 34b, which are obtained by bending the pair of side surface portion forming portions 24a and 24b.

However, it is not essential that the interference suppressing member 10 be made of a sheet-shaped member. For example, the interference suppressing member 10 may be formed by resin molding so as to have the same shape as the three-dimensional interference suppressing member 30. However, if the interference suppressing member 10 is made of a sheet-shaped member, delivering the interference suppressing members 10 in the shape of sheets, which are then bent three-dimensionally, can reduce the delivery cost. Furthermore, if a three-dimensional interference suppressing member is employed as the interference suppressing member 10, bending a sheet-shaped member into the three-dimensional interference suppressing member can reduce the manufacturing cost such as molds, compared to the case where the three-dimensional interference suppressing member is formed by resin molding.

Furthermore, it is not essential that the three-dimensional interference suppressing member 30 be gutter-shaped. For example, the three-dimensional interference suppressing member 30 may be formed so that its cross section has an L-shape, V-shape, or the like. In this case, the sheet-shaped interference suppressing member 14 is provided only with one folding line 16. Furthermore, the three-dimensional interference suppressing member 30 may be partially tubular such that the side surface portions 34 are connected to each other at their ends opposite to the sides on which they are connected to the bottom portion 32.

Furthermore, it is not essential that the sideward protruding portions 36 and 37 protrude from the bottom portion 32, and the sideward protruding portions may protrude from the side surface portions 34. In this case, by making a first slit in the stage of the sheet-shaped interference suppressing member from an end in the width direction of the base material 15 to the central position in the side surface portion, making a second slit from the top of the first slit in the longitudinal direction of the base material 15, and defining a folding line from the top of the second slit to the end in the width direction of the base material, that portion of the base material 15 that is located between the second slit and the end in the width direction of the base material 15 serves as a sideward protruding portion forming portion. Accordingly, it is possible to form the sheet-shaped interference suppressing member into a three-dimensional interference suppressing member provided with the sideward protruding portions that protrude from its side surface portions.

The wire harness 60 (see FIG. 7) is obtained by bundling together a plurality of electric wires with at least one branch portion 64 branched from a main wire portion 62. The plurality of electric wires are bundled together with, for example, a banding member such as a tape or a banding band. Furthermore, here, the wire harness 60 is provided with the clamps 70.

The electric wires have a configuration in which a coated portion is provided by coating the outer circumference of a core wire with an extruded resin, for example. The electric wires are provided with, at ends thereof, connectors, and are used to electrically connect various types of electric devices installed in the vehicle 80 or the like, in a state in which they are arranged in a wiring destination in the vehicle 80 or the like. Note that light fibers or the like may be attached to the wire harness 60 along the electric wires.

The clamps 70 are members for fixing the wire harness 60. The clamps 70 include engaging portions 72 that can engage with the attaching holes 42 and 43. The wire harness 60 is fixed to the reinforcement 40 as a result of the wire harness 60 being provided with the clamps 70, and the engaging portions 72 of the clamps 70 engaging with the attaching holes 42 and 43 formed in the reinforcement 40. Here, band clamps 70 that are integrally molded with a band portion 76 are employed as the clamps 70, and function also as the banding member.

The band clamps 70 each include, in addition to the engaging portion 72, the band-shaped band portion 76 and a band engaging portion 78 that can engage with the ends of the band portion 76 wound around the electric wires. Here, a pair of band clamps 70 are provided on the main wire portion 62. Furthermore, here, the engaging portions 72 include: the engaging pieces 73 that can be inserted into the attaching holes 42 and 43, and can engage with the attaching holes 42 and 43 after the insertion; and disc portions 74 that are disc spring-shaped, and press against the edge portions of the attaching holes 42 and 43 in the state in which the engaging pieces 73 are engaged with the attaching holes 42 and 43. Furthermore, here, the band engaging portions 78 are formed inside the engaging pieces 73 (see FIG. 10).

Note that, here, the band clamps 70 in which the band engaging portion 78 is formed inside the engaging piece 73 are employed as the clamps 70, but other types of clamps 70 may be employed as the clamps 70. Examples of other types of clamps 70 include band clamps in which a band engaging portion is provided below a disc portion, and a type of clamps in which a fixation plate is provided below a disc portion, and the fixation plate and the electric wires are fixed to each other by winding a tape, or the like.

Figure 6:
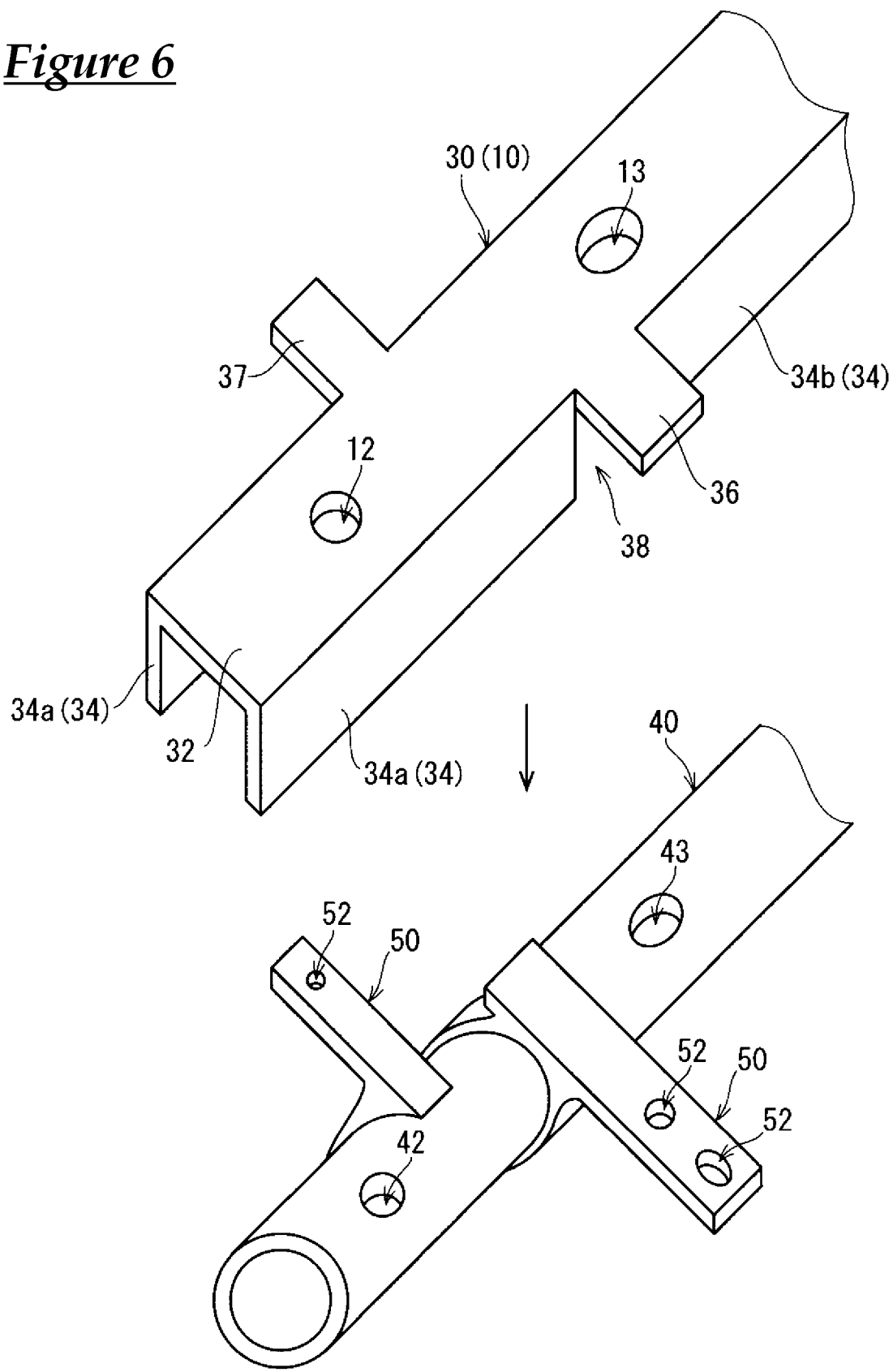
FIG. 6 is a diagram illustrating a step of a wire harness assembling method according to an embodiment.
Figure 7:
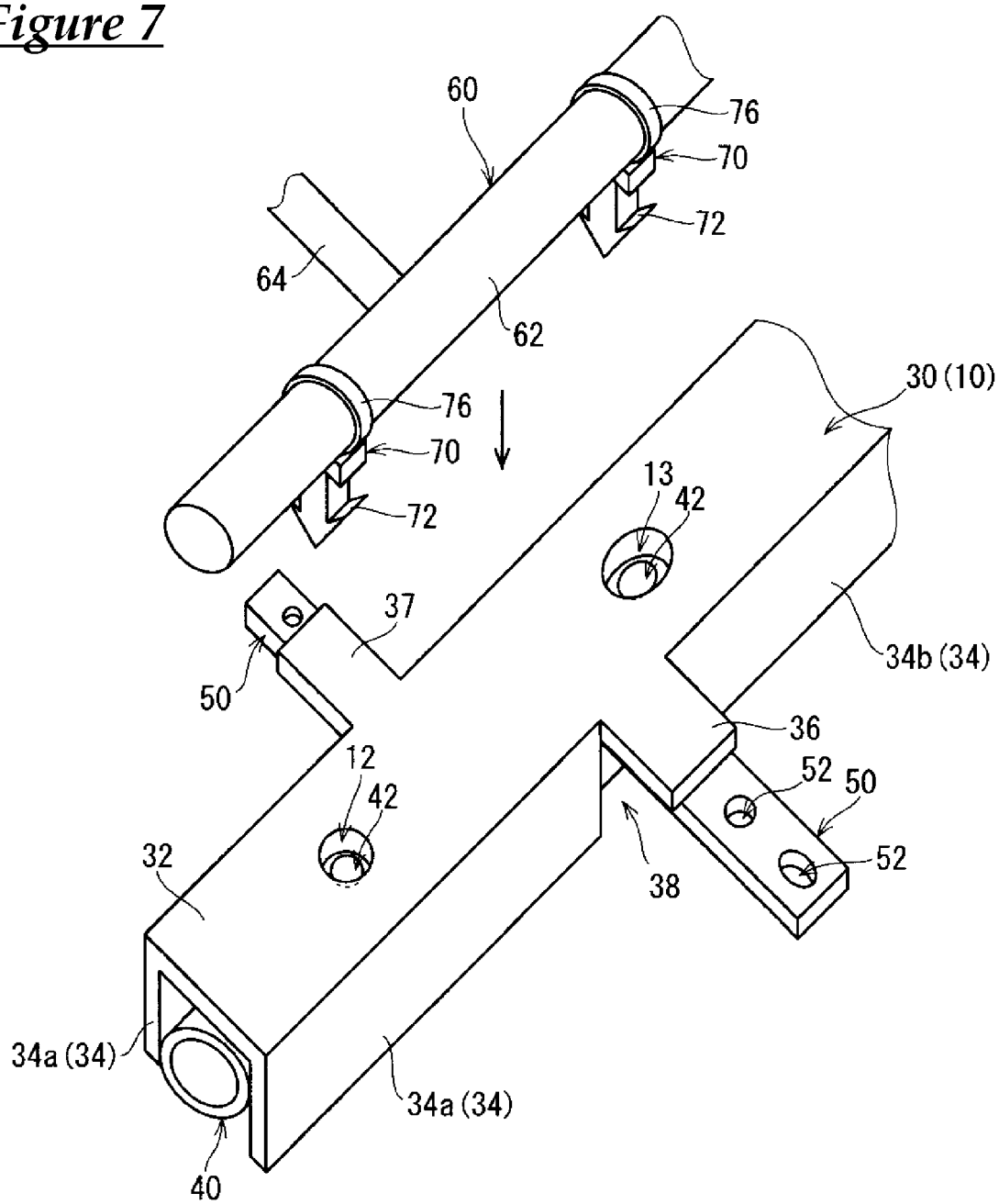
FIG. 7 is a diagram illustrating a step of the wire harness assembling method according to the embodiment.
Figure 8:
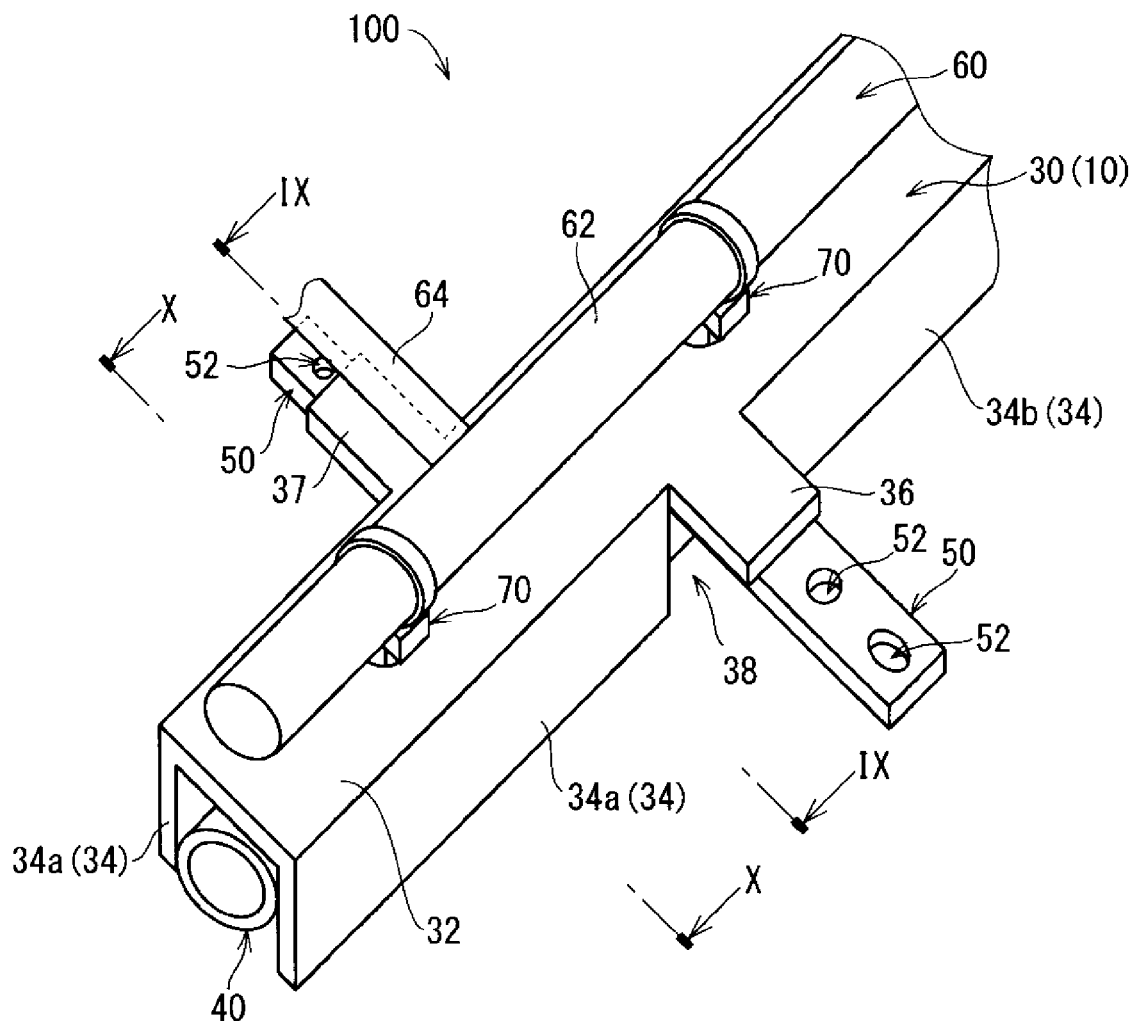
FIG. 8 is a diagram illustrating a step of the wire harness assembling method according to the embodiment.
Figure 9:
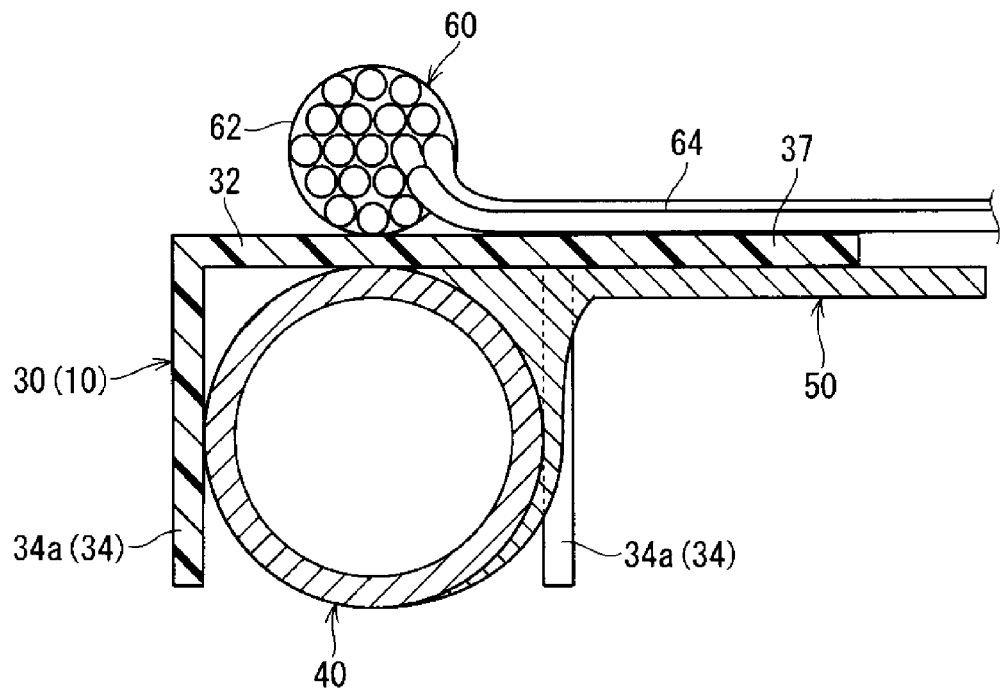
FIG. 9 is a cross-sectional view taken along line IX-IX in FIG. 8.

The following will describe a wire harness assembling method for assembling the wire harness. FIGS. 6 to 8 are diagrams each illustrating one step of the wire harness assembling method according to the embodiment. FIG. 9 is a cross-sectional view taken along line IX-IX in FIG. 8. FIG.

10 is a cross-sectional view taken along line X-X in FIG. 8. Note that FIG. 8 is also a perspective view illustrating a wire harness assembly structure 100.

First, as shown in FIG. 6, the interference suppressing member 10 is attached to at least a part of the elongated reinforcement 40 that is arranged on the back side of the instrument panel 82 of the vehicle 80, and extends in the width direction of the vehicle 80 (step (a)).

Specifically, here, the three-dimensional interference suppressing member 30 is attached to the reinforcement 40. More specifically, the three-dimensional interference suppressing member 30 is arranged so that the bottom portion 32 extends along the reinforcement 40, and the reinforcement 40 is located between the side surface portions 34 provided at the two ends of the bottom portion. Also, the three-dimensional interference suppressing member 30 is arranged so that the brackets 50 protrude from the openings 38, and the sideward protruding portions 36 and 37 cover the brackets 50.

Of course, the interference suppressing member 10 that is attached in this stage may also be the sheet-shaped interference suppressing member 14. Furthermore, it is also possible that the sheet-shaped base material 15 without the slits 18 and 19 and the folding lines 16 is used as it is as the interference suppressing member 10, and is attached to the reinforcement 40. Alternatively, it is also possible that a resin molded article having an outer shape like that of the three-dimensional interference suppressing member 30 is used as the interference suppressing member 10, and is attached to the reinforcement 40.

If the sheet-shaped base material 15 is used as it is as the interference suppressing member, it is also possible that those portions of a bottom portion that cover the extending brackets 50 of the reinforcement 40 protrude laterally and cover the brackets 50.

Then, after the step (a), the wire harness 60 is arranged, as shown in FIG. 7, so as to face the reinforcement 40 with the interference suppressing member 10 interposed therebetween (step (b)).

Specifically, here, the main wire portion 62 is arranged so as to face the reinforcement 40 with the bottom portion 32 of the three-dimensional interference suppressing member 30 interposed therebetween. Furthermore, the branch portion 64 is arranged so that its base end portion faces the bracket 50 with the sideward protruding portion 37 interposed therebetween.

Here, the reinforcement 40 has the attaching holes 42 and 43, and the interference suppressing member 10 has the through holes 12 and 13 at the positions that correspond to the attaching holes 42 and 43. Furthermore, the wire harness 60 is provided with the clamps 70 that engage with the attaching holes 42 and 43. By passing the clamps 70 through the through holes 12 and 13, and engaging the clamps 70 with the attaching holes 42 and 43, the wire harness 60 is fixed to the reinforcement 40 (step (b1)).

Figure 10:
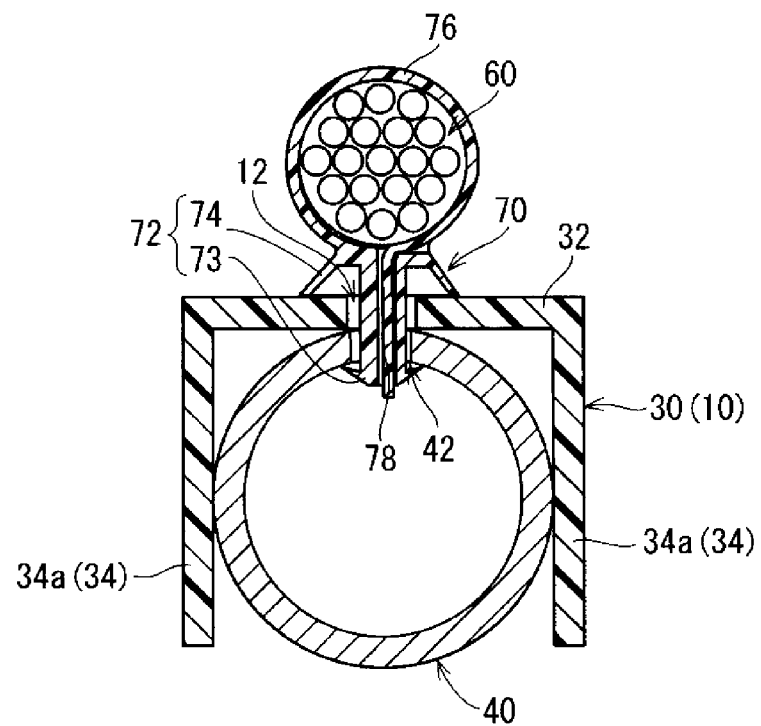
FIG. 10 is a cross-sectional view taken along line X-X in FIG. 8.

Specifically, as shown in FIG. 10, the engaging piece 73 of the engaging portion 72 of the clamp 70 is passed through the through hole 12 (13) of the interference suppressing member 10, and then is engaged with the attaching hole 42 (43) of the reinforcement 40. At this time, in FIG. 10, the disc portion 74 of the clamp 70 abuts against the interference suppressing member 10, but this is not essential. The disc portions 74 may also be passed through the through holes 12 and 13, and may abut against the reinforcement 40. In this case, the interference suppressing member 10 is interposed between the electric wires and the reinforcement 40 in the vicinity of the edges of the through holes 12 and 13.

However, the step (b1) is not essential, and there may be cases where the interference suppressing member 10 and the wire harness 60 are separately fixed to the reinforcement 40, such as, for example, cases where the interference suppressing member 10 is fixed to the reinforcement 40 with a double-sided tape, and the clamps 70 of the wire harness 60 are engaged with attaching holes that are formed at locations at which the interference suppressing member 10 is not present.

By attaching the interference suppressing member 10 and the wire harness 60 to the reinforcement 40 in the above-described manner, the wire harness assembly structure 100 shown in FIG. 8 is complete.

Note that in the step (a) of attaching the interference suppressing member 10 to the reinforcement 40, the interference suppressing member 10 may or may not be fixed to the reinforcement 40. If the interference suppressing member 10 is fixed to the reinforcement 40, it is conceivable that, for example, a tape (a single-sided tape or a double-sided tape) or an adhesive is used, or the interference suppressing member is additionally provided with a projection that is inserted into an attaching hole in the reinforcement 40 or the brackets. If the interference suppressing member 10 is not fixed to the reinforcement 40, it is preferable that the interference suppressing member 10 be positioned by arranging the wire harness 60 in step (b). In this case, it is conceivable that the interference suppressing member 10 should be still due to its own weight for example, or be pressed by a hand of an operator, until the interference suppressing member 10 is positioned by arranging the wire harness 60.

As described above, here, in the step (a), the three-dimensional interference suppressing member 30, which is obtained by bending the sheet-shaped interference suppressing member 14, is attached to the reinforcement 40. That is, here, the interference suppressing member 10 is made of a sheet-shaped member whose width is larger than the width of the reinforcement 40. Prior to the step (a), at least a part of the sheet-shaped member is bent to form that part of the interference suppressing member 10 that is to cover the periphery of the reinforcement 40 when the interference suppressing member 10 and the wire harness 60 are attached to the reinforcement 40 (step (c)).

Furthermore, here, at least one bracket 50 is attached to the reinforcement 40, extending in a direction that intersects the longitudinal direction of the reinforcement 40. Then, the pair of side surface portion forming portions 24a and 24b that are located at an end in the width direction of the sheet-shaped member, and face each other in the longitudinal direction of the sheet-shaped member at a distance that is larger than the width of the brackets 50 are bent, so that the opening 38 from which the bracket 50 protrudes outward is formed in the interference suppressing member 10 (step (c1)).

Specifically, the side surface portion forming portions 24 of the sheet-shaped interference suppressing member 14 are bent along the folding lines 16. Although, here, the sheet-shaped interference suppressing member 14 is bent, the sheet-shaped interference suppressing member 14 may be curved. Furthermore, here, the pairs of side surface portion forming portions 24a and 24b that face each other with the sideward protruding portion forming portions 26 and 27 interposed therebetween are bent while the sideward protruding portion forming portions 26 and 27 are kept unbent. Accordingly, the openings 38 from which the brackets 50 protrude outward are formed between the pairs of side surface portions 34a and 34b, which are obtained by bending the pairs of side surface portion forming portions 24a and 24b.

Note that it is not essential that the step (c) be performed prior to the step (a). The step (c) may be performed between the step (a) and the step (b), or may be performed after the step (b). Alternatively, the step (c) may be performed at the same time as the step (a) or the step (b). In other words, the step (c) may be performed in any stage.

Specifically, the sheet-shaped interference suppressing member 14 is bent to form the three-dimensional interference suppressing member 30 at the same time or after the sheet-shaped interference suppressing member 14 is attached as it is to the reinforcement 40. At this time, the sheet-shaped interference suppressing member 14 may be bent to form the three-dimensional interference suppressing member 30 before or after the wire harness 60 is arranged on the reinforcement 40. Alternatively, the sheet-shaped interference suppressing member 14 may also be bent to form the three-dimensional interference suppressing member 30 at the same time as the wire harness 60 is arranged on the reinforcement 40.

According to the wire harness assembling method of the embodiment, since the step (a) of attaching the interference suppressing member 10 to at least a part of the elongated reinforcement 40, the reinforcement 40 being arranged on the back side of the instrument panel 82 of the vehicle 80 and extending in the width direction of the vehicle 80, is performed prior to the step (b) of arranging the wire harness 60 so that it faces the reinforcement 40 with the interference suppressing member 10 interposed therebetween, it is possible to suppress an increase in the number of components that constitute the wire harness 60 that is arranged in the vicinity of the instrument panel reinforcement 40, and complication of the assembly operation.

Furthermore, since the method further includes the step (c) of bending at least a part of the sheet-shaped member to form that part of the interference suppressing member 10 that covers the reinforcement 40 when the interference suppressing member 10 and the wire harness 60 are attached to the reinforcement 40, it is possible to easily prevent the interference between the electric wires and the reinforcement 40 in a broader range.

Furthermore, since the method further includes the step (c1) of bending the pair of side surface portion forming portions 24a and 24b that are located at an end in the width direction of the sheet-shaped member, and face each other at a distance that is larger than the width of the bracket 50, so that the opening 38 from which the bracket 50 protrudes outward is formed in the interference suppressing member 10, it is possible to bend the sheet-shaped member while avoiding the bracket 50. Accordingly, it is possible to easily prevent the interference between the electric wires and the reinforcement 40 in a broader range.

Furthermore, since the method further includes the step (b1) of fixing the wire harness 60 to the reinforcement 40 by passing the clamps 70 through the through holes 12 and 13, and engaging the clamps 70 with the attaching holes 42 and 43, when the wire harness 60 is fixed to the reinforcement 40, the interference suppressing member 10 as well is fixed to the reinforcement 40. Furthermore, at this time, those portions of the interference suppressing member 10 that are located around the through holes 12 and 13 are sandwiched by the wire harness 60 and the reinforcement 40, and thus the interference suppressing member 10 is prevented from wobbling.

Furthermore, according to the interference suppressing member 10 and the wire harness assembly structure 100 of the embodiment, the interference suppressing member 10 is provided with the bottom portion 32 that extends in the longitudinal direction of the reinforcement 40, and thus attaching the interference suppressing member 10 prior to the wire harness 60 to the reinforcement 40 makes it possible to suppress an increase in the number of components that constitute the wire harness 60 that is arranged in the vicinity of the instrument panel reinforcement 40, and complication of the assembly operation.

Furthermore, since the three-dimensional interference suppressing member 30 is further provided with the side surface portions 34 that are bent at the ends in the width direction of the bottom portion 32, the three-dimensional interference suppressing member 30 can cover the periphery of the reinforcement 40. Accordingly, it is possible to more reliably prevent the interference between the wire harness 60 and the reinforcement 40.

Furthermore, since the side surface portions 34 of the three-dimensional interference suppressing member 30 are provided with the openings 38 from which the brackets 50 can protrude outward, the side surface portions 34 can cover the reinforcement 40 while avoiding the brackets 50.

Furthermore, the three-dimensional interference suppressing member 30 is further provided with the sideward protruding portions 36 and 37 that extend from the inner peripheral edges of the openings 38 in the directions in which the brackets 50 protrude, the sideward protruding portions 36 and 37 being configured to cover the brackets 50, and thus it is possible to prevent the brackets 50 from interfering with the electric wires that constitute the wire harness 60.

FIG. 11 is a perspective view illustrating an interference suppressing member 10A according to a modification. FIG. 12 is a perspective view illustrating the state in which the wire harness 60 and the interference suppressing member 10A according to the modification are attached to the reinforcement 40. Note that FIG. 11 is also a diagram illustrating a sheet-shaped interference suppressing member 14A, and FIG. 12 is also a diagram illustrating a three-dimensional interference suppressing member 30A and a wire harness assembly structure 100A. Furthermore, in the description of the present modification, the same reference signs are given to the same constituent components that have been described in the embodiment, and descriptions thereof are omitted.

The sheet-shaped interference suppressing member 14A according to the modification differs from the sheet-shaped interference suppressing member 14 according to the embodiment in that a recess portion 20 is formed between a pair of side surface portion forming portions 24a and 24b that are located at one end, in the width direction, of the base material 15. In other words, no sideward protruding portion forming portion 26 is provided at the one end in the width direction of the base material 15 of the sheet-shaped interference suppressing member 14A of the modification. Accordingly, the three-dimensional interference suppressing member 30A according to the modification is not provided with, in one opening 38, a sideward protruding portion 36 that protrudes from the inner peripheral edge of the opening 38.

Such an interference suppressing member 10A may be applied to cases such as the wire harness assembly structure 100A in which, as shown in FIG. 12 for example, a bracket 50 is attached to the reinforcement 40, but the main wire portion 62 and the branch portion 64 of the wire harness 60 are not arranged along that bracket 50.

According to the interference suppressing member 10A and the wire harness assembly structure 100A of the modification, the sideward protruding portion forming portion 26 of the sheet-shaped interference suppressing member 14A, or the sideward protruding portion 36 of the three-dimensional interference suppressing member 30A are not provided, and thus it is possible to reduce the weight of the sheet-shaped interference suppressing member 14A or the three-dimensional interference suppressing member 30A.

Note that the structures described in the above-described embodiment and modification may suitably be combined with each other as long as they do not contradict each other.

The present invention has been described in detail above, but the above description is exemplary in all respects, and the present invention is not limited to this. It is conceivable that a large number of modifications that are not exemplified are possible without departing from the scope of the present invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

REFERENCE SIGNS LIST 10, 10A Interference suppressing member
12, 13 Through hole
14, 14A Sheet-shaped interference suppressing member
15 Base material
16 Folding lines
18, 19 Slits
20 Recess portion
22 Bottom portion forming portion
24 Side surface portion forming portion
26, 27 Sideward protruding portion forming portion
30, 30A Three-dimensional interference suppressing member
32 Bottom portion
34 Side surface portion
36, 37 Sideward protruding portion
38 Opening
40 Reinforcement
42, 43 Attaching hole
50 Bracket
52 Attaching hole
60 Wire harness
70 Band clamp
72 Engaging portion
80 Vehicle
82 Instrument panel
90 Hollow board member
100, 100A Wire harness assembly structure
L Reference line

The invention claimed is:

1. A wire harness assembling method for assembling a wire harness comprising:
   a step (a) of attaching an interference suppressing member to at least a part of an elongated reinforcement, the reinforcement being arranged on a back side of an instrument panel of a vehicle and extending in a width direction of the vehicle; and
   a step (b) of arranging a wire harness so that the wire harness faces the reinforcement with the interference suppressing member interposed between the wire harness and the reinforcement, the step (b) being performed after the step (a), wherein the interference suppressing member is made of a sheet-shaped member that is comprised of a resin and whose width is larger than a width of the reinforcement, and
   a step (c) of bending at least a part of the sheet-shaped member to form that part of the interference suppressing member that covers a periphery of the reinforcement when the interference suppressing member is attached to the reinforcement, wherein the interference suppressing member covers one side of the wire harness.

2. The wire harness assembling method according to claim 1, wherein at least one bracket is attached to the reinforcement and extends in a direction that intersects a longitudinal direction of the reinforcement, and
   the method further comprises a step (c1) of bending a pair of side surface portion forming portions that are located at an end in a width direction of the sheet-shaped member, and face each other in a longitudinal direction of the sheet-shaped member at a distance that is larger than a width of the bracket, so that an opening from which the bracket protrudes outward is formed in the interference suppressing member.

3. The wire harness assembling method according to claim 1, wherein the reinforcement is provided with an attaching hole, the interference suppressing member is provided with a through hole at a position that corresponds to the attaching hole, and the wire harness is provided with a clamp that engages with the attaching hole, and
   the method further comprises a step (b1) of fixing the wire harness to the reinforcement by passing the clamp through the through hole, and engaging the clamp with the attaching hole.

4. An interference suppressing member that is made of a sheet-shaped member comprised of a resin, and is configured to be attached to a reinforcement that is arranged on a back side of an instrument panel of a vehicle and extends in a width direction of the vehicle, the interference suppressing member comprising:
   a bottom portion that extends in a longitudinal direction of the reinforcement; and
   a side surface portion that is obtained by bending an end in a width direction of the bottom portion,
   wherein the interference suppressing member is configured to cover one side of a wire harness.

5. The interference suppressing member according to claim 4, wherein at least one bracket is attached to the reinforcement and extends in a direction that intersects a longitudinal direction of the reinforcement, and the side surface portion of the interference suppressing member is provided with an opening from which the bracket can protrude outward.

6. The interference suppressing member according to claim 5, further comprising:

a sideward protruding portion that extends from an inner peripheral edge of the opening in a direction in which the bracket protrudes, the sideward protruding portion being configured to cover the bracket.

7. A wire harness assembly structure, comprising:

an elongated reinforcement that is arranged on a back side of an instrument panel of a vehicle and extends in a width direction of the vehicle;

the interference suppressing member according to claim 4 that is attached to the reinforcement; and a wire harness that is arranged facing the reinforcement with the interference suppressing member interposed between the wire harness and the reinforcement.

\* \* \* \* \*